United States Patent [19]

Fodale et al.

[11] Patent Number: 5,233,962
[45] Date of Patent: Aug. 10, 1993

[54] KNOCK STRATEGY INCLUDING HIGH OCTANE SPARK ADVANCE

[75] Inventors: Francis M. Fodale, Beverly Hills; Gregory J. Dykstra, Grosse Pointe Woods; Robert E. Lee, West Bloomfield; Gregory T. Weber, Farmington Hills; James M. Witalec, Westland; James T. Wyrembelski, Fraser, all of Mich.

[73] Assignee: Chrysler Corporation, Highland Park, Mich.

[21] Appl. No.: 876,633

[22] Filed: Apr. 30, 1992

[51] Int. Cl.⁵ ............................................. F02P 5/14
[52] U.S. Cl. .................................................. 123/425
[58] Field of Search ................. 123/425, 421, 435; 364/431.08

[56] References Cited

U.S. PATENT DOCUMENTS

| | | | |
|---|---|---|---|
| 4,271,469 | 6/1981 | Kawai et al. | 364/431 |
| 4,308,519 | 12/1981 | Garcea et al. | 340/53 |
| 4,716,874 | 1/1988 | Hilliard et al. | 123/425 |
| 4,819,171 | 4/1989 | Morita | 123/425 |
| 4,819,603 | 4/1989 | Morita et al. | 123/425 |
| 4,846,129 | 6/1989 | Noble | 123/425 |
| 4,858,580 | 8/1989 | Kamise et al. | 123/425 |
| 4,882,695 | 11/1989 | Mieno et al. | 364/431.08 |
| 4,936,277 | 6/1990 | Deutsch et al. | 123/436 |
| 4,976,241 | 12/1990 | Ishida et al. | 123/425 |
| 5,000,149 | 3/1991 | Miyama | 123/425 |
| 5,027,772 | 7/1991 | Hongo | 123/421 |
| 5,027,773 | 7/1991 | Shimomura et al. | 123/425 |
| 5,038,735 | 8/1991 | Hosoya et al. | 123/425 |
| 5,107,814 | 4/1992 | Nishiyama et al. | 123/435 |

Primary Examiner—Raymond A. Nelli
Attorney, Agent, or Firm—Mark P. Calcaterra

[57] ABSTRACT

A method is provided for controlling knock on an internal combustion engine. The method includes the steps of determining a maximum value of knock and determining whether conditions are right for updating the maximum value of knock. The method also includes using an unmodified spark advance if conditions are not right for updating the maximum value of knock and modifying the spark advance if conditions are right for updating the maximum value of knock.

20 Claims, 9 Drawing Sheets

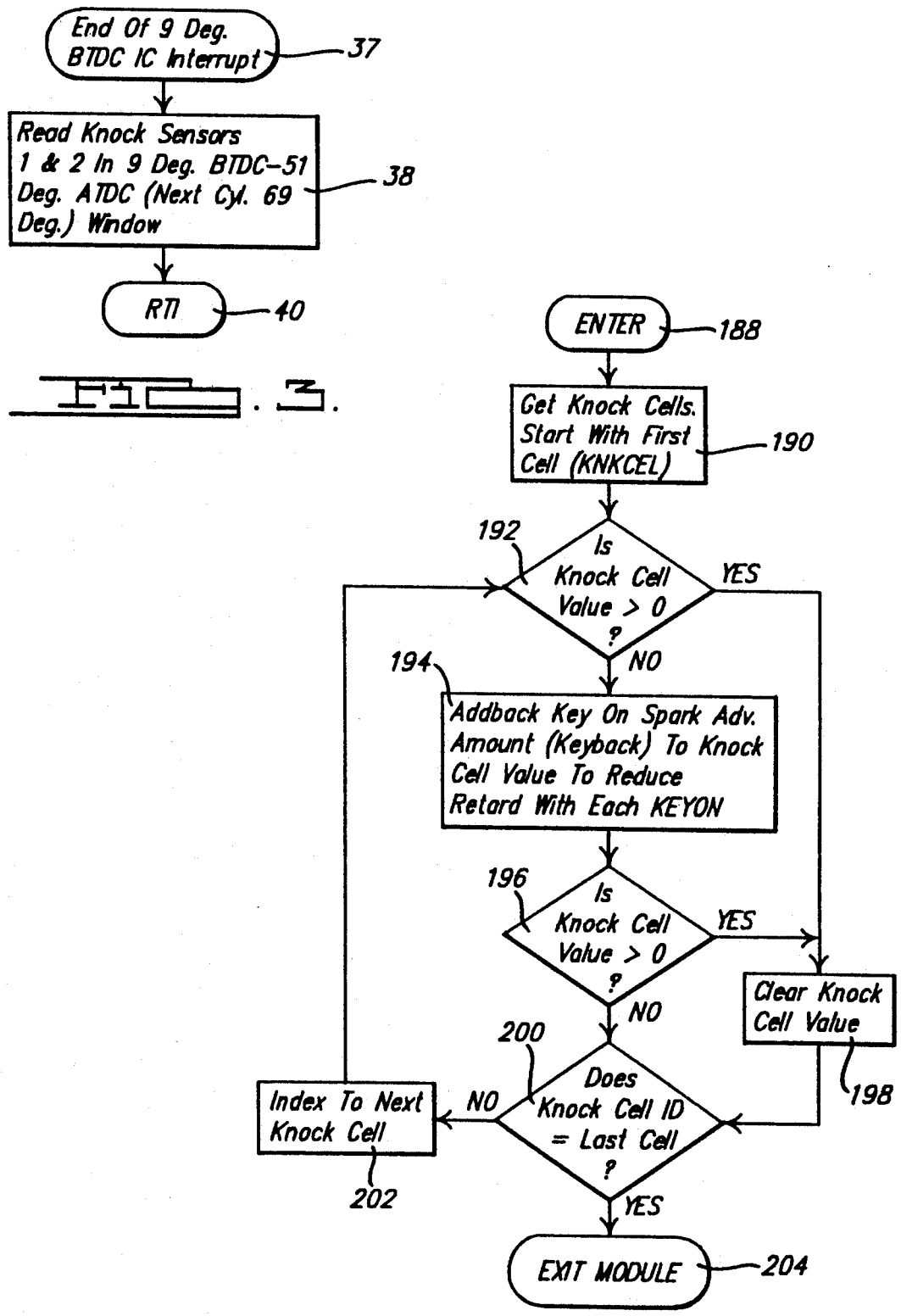

KNOCK STRATEGY INCLUDING HIGH OCTANE SPARK ADVANCE

BACKGROUND OF THE INVENTION

1. Field of the Invention

The present invention relates generally to a knock strategy for an internal combustion engine and, more specifically, to a knock strategy including high octane spark advance for an internal combustion engine.

2. Description of the Related Art

Generally, a high specific output internal combustion engine is more susceptible to engine damaging detonation or knock. The threat of knock generally forces the spark advance calibrations for the engine to be somewhat less than optimal (e.g., minimum spark advance for maximum brake torque (MBT)) to operate on low octane fuels. As a result, less than MBT spark advance lowers combustion efficiency, performance and fuel economy of the engine.

Accordingly, there is a need in the art to provide a knock strategy which allows the spark advance for the engine to be calibrated closer to MBT on high octane fuels and protects the engine from knock when running on low octane fuels. There is also a need in the art to provide a knock strategy which provides maximum fuel economy, performance and combustion efficiency to engines using higher octane fuels in addition to fuels the engine was initially calibrated.

SUMMARY OF THE INVENTION

It is, therefore, one object of the present invention to provide a knock strategy for an internal combustion engine.

It is another object of the present invention to provide a knock strategy including high octane spark advance for an internal combustion engine.

It is yet another object of the present invention to adjust a knock threshold to account for differences in engine builds, operating conditions, aging, etc.

It is a further object of the present invention to provide a new and improved knock strategy for an internal combustion engine.

To achieve the foregoing objects, the present invention is a method of controlling knock for an internal combustion engine. The method includes the steps of determining a maximum value of knock and determining whether conditions are right for updating the maximum value of knock. The method also includes the steps of using an unmodified spark advance if conditions are not right for updating the maximum value of knock and modifying the spark advance if conditions are right for updating the maximum value of knock.

One advantage of the present invention is that a knock strategy is provided for an internal combustion engine which includes high octane spark advance. Another advantage of the present invention is that the knock strategy provides for modification of the knock threshold to account for differences in engine builds, operating conditions, aging, etc. Yet another advantage of the present invention is that the knock strategy can adjust engine parameters (e.g., lower spark advance) to lower knock to acceptable levels. Still another advantage of the present invention is that the knock strategy can be used to increase spark advance beyond calibrated values (toward MBT) for maximum efficiency and performance of fuel economy for engines. A further advantage of the present invention is that the knock strategy retards the spark advance under long term (persistent) knock conditions for specific speed/load combinations as opposed to being universally applied across all speeds/loads.

Other objects, features and advantages of the present invention will be readily appreciated as the same becomes better understood after reading the following description taken in conjunction with the accompanying drawings.

BRIEF DESCRIPTION OF THE DRAWINGS

FIG. 3 is a flowchart of a knock sensor read subroutine for the knock strategy of FIG. 2.

FIG. 5 is a flowchart of a non-diagnostic subroutine for the knock strategy of FIG. 2.

DESCRIPTION OF THE PREFERRED EMBODIMENT(S)

Figure 1:
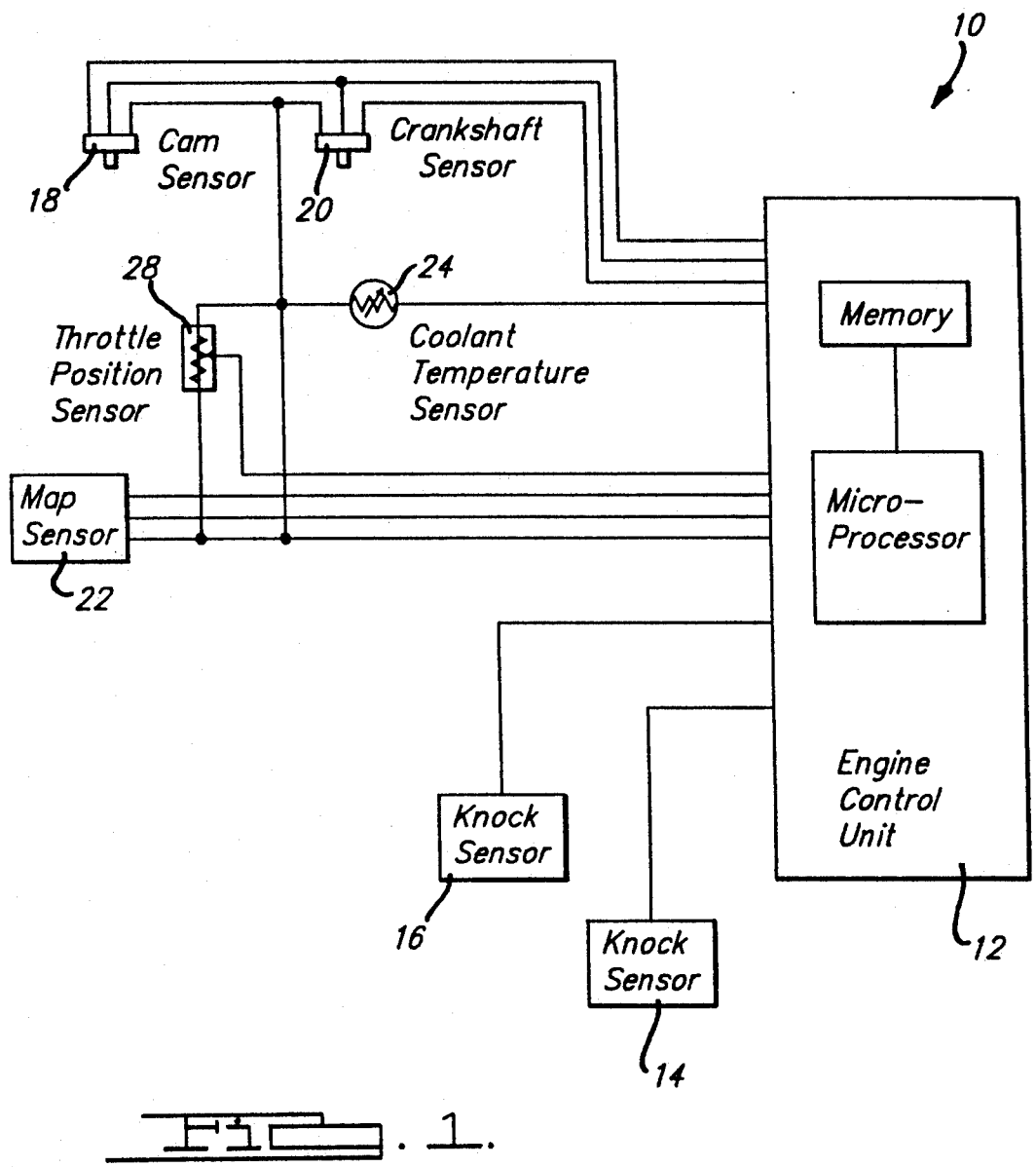
FIG. 1 is an overall schematic view of a hardware diagram for a knock strategy according to the present invention.

Referring to FIG. 1, a knock control system 10 is shown for an internal combustion engine (not shown). The knock control system 10 includes an engine controller or Engine Control Unit (ECU) 12. The ECU 12 includes a microprocessor, memory, (address, control and data) bus lines and other hardware and software to perform tasks of engine control. The knock control system 10 also includes first and second knock sensors 14 and 16 connected to the ECU 12 and the internal combustion engine for sensing knock of the engine. The knock control system 10 includes a cam sensor 18 and a crank shaft sensor 20 connected to the ECU 12 and internal combustion engine to identify the cylinders and speed (RPM) of the crankshaft or engine. The knock control system 10 also includes a manifold absolute pressure (MAP) sensor 22 connected to the ECU 12 and the internal combustion engine for sensing MAP. The knock control system 10 includes a coolant temperature sensor 24 connected to the ECU 12 and the internal combustion engine for sensing the temperature of the engine. The knock control system 10 also includes a throttle position sensor 28 connected to the ECU 12 and the internal combustion engine for sensing throttle position. It should be appreciated that the knock control system 10 may include other hardware not described for carrying out or performing the knock strategy or methodology to be described.

Referring to FIG. 2A–C and 3, a knock strategy or methodology, according to the present invention, is shown. The knock methodology includes five sections: 1) knock sensor read; 2) adaptive background noise updating; 3) short term spark retard under knock conditions; 4) long term spark retard under persistent engine knocking; and 5) long term (high octane) spark advance under extended periods of no knock engine operation. The functioning of each section is described below.

In FIG. 3, the knock sensor read methodology begins or starts with bubble 37 at the end of the 9 degree before top dead center IC interrupt. The knock sensor read methodology advances to block 38 and reads (samples) the first and second knock sensors 14 and 16 from the 9 degree before top dead center to the 51 degree after top dead center positions (next 69 degree edge). The knock sensors 14 and 16 sense an acceleration in a certain frequency range and send an appropriate voltage signal to the ECU 12. The knock sensor read methodology reads the knock sensors 14 and 16 in the window around each cylinder's ignition event. The knock sensor read methodology then returns through bubble 40 to block 42 of the knock methodology in FIG. 2A.

Figure 2A:
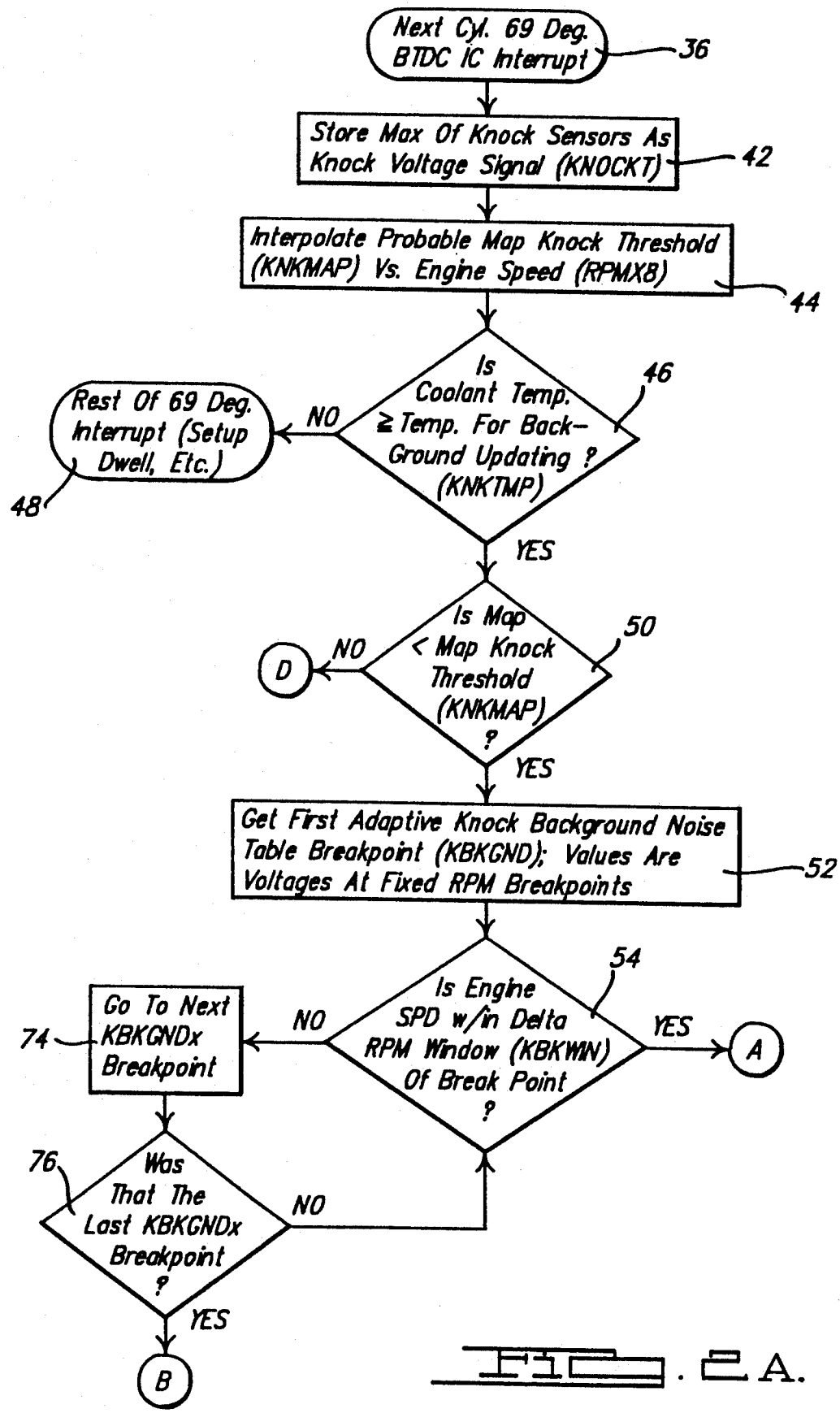
FIG. 2A through C are flowcharts of a knock strategy according to the present invention.
Figure 2B:
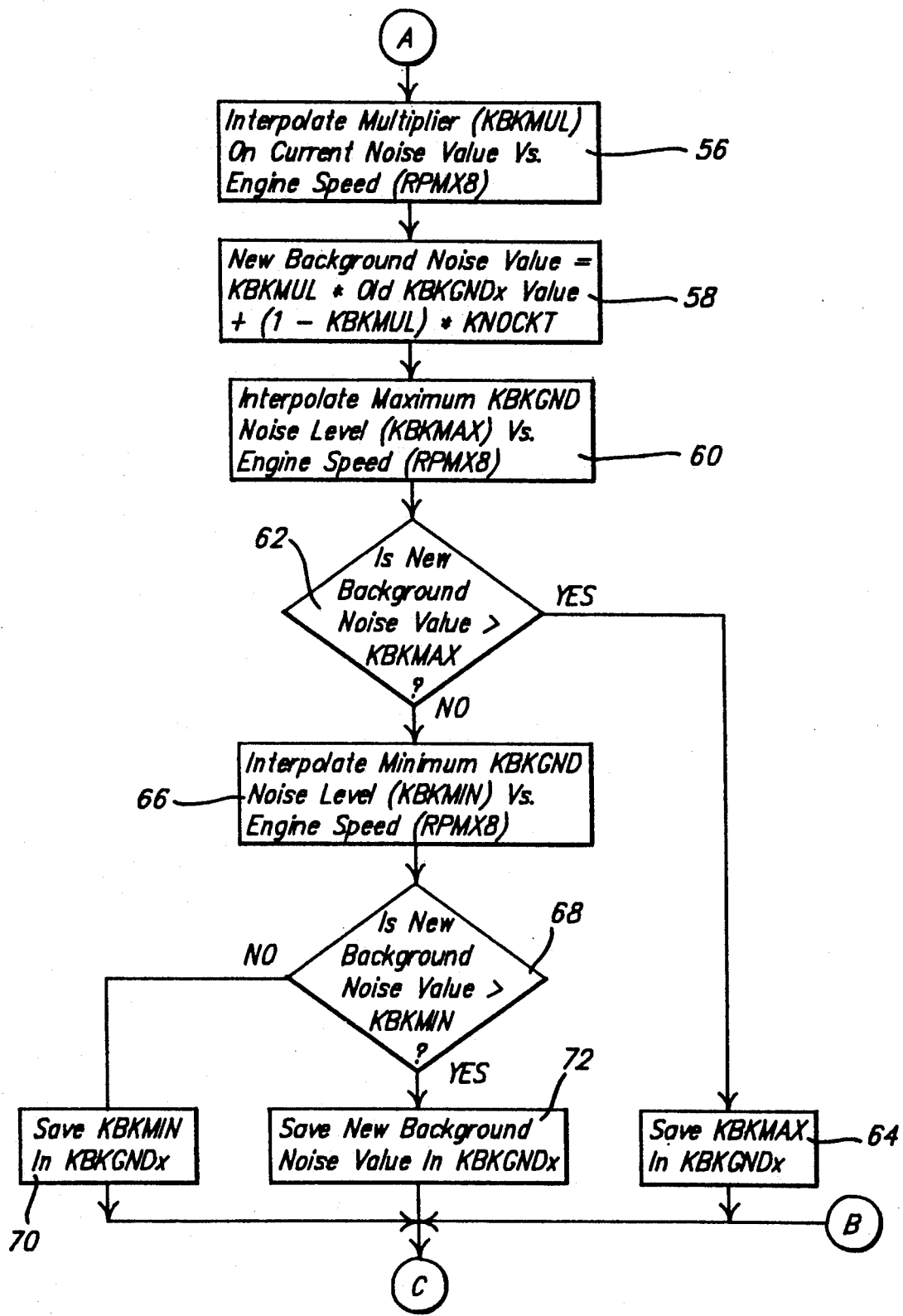

In block 42 of FIG. 2A, the methodology saves or stores the maximum value of the voltage signals from the knock sensors 14 and 16 as the knock sensor voltage signal (KNOCKT). From block 42, the knock methodology advances to block 44 and interpolates a probable map knock threshold (KNKMAP) versus engine speed (RPMX8). The crankshaft sensor 20 senses the speed of the engine and sends an appropriate signal to the ECU 12. The interpolation is performed on a table stored in memory of KNKMAP versus RPMX8. The knock methodology then advances to decision block 46 to begin adaptive background noise updating.

During adaptive background noise updating, the methodology computes a running composite average of the knock sensor voltages generated during conditions (speed, load) of low knock probability. The average represents the level of "background noise" that must be exceeded by knock sensors 14 and 16 in order to be classified as knock. In decision block 46, the methodology determines whether the engine coolant temperature (CLTEMP) is greater than or equal to a predetermined temperature for background updating (KNKTMP). This is accomplished by the coolant temperature sensor 24 transmitting a signal to the ECU 12 corresponding to the temperature of the engine coolant. KNKTMP has a predetermined value stored in memory of the ECU 12 and corresponds to a sufficiently warmed up engine trigger point. If CLTEMP is not greater than or equal to KNKTMP, the methodology advances to bubble 48. In bubble 48, the methodology ignores adaptive background noise updating and sets up dwell, etc., with an unmodified spark advance.

If CLTEMP is greater than or equal to KNKTMP, the knock methodology advances to decision block 50 and determines whether MAP is less than the MAP knock threshold (KNKMAP) previously interpolated in block 44. This is accomplished by the MAP sensor 22 transmitting a signal to the ECU 12 corresponding to MAP. If MAP is less than a MAP knock threshold, the methodology advances to block 52 and gets a first adaptive knock background noise table (KBKGND) breakpoint. The breakpoint values are knock sensor voltages at fixed RPM breakpoints in a table (KBKGND) of MAP versus engine speed (RPMX8) stored in memory of ECU 12. The methodology then advances to decision block 54.

In decision block 54, the methodology determines whether the engine speed (RPMX8) is within a predetermined delta RPM window (KBKWIN) of the breakpoint (KBKGNDx). The methodology uses RPMX8 to index into and sequentially search through KBKGNDx locations. The methodology selects KBKGNDx if RPMX8 is within KBKWIN of that location's RPM breakpoint. If an appropriate KBKGNDx is found, the methodology advances to block 56 and interpolates a multiplier (KBKMUL) on current background noise value (KBKGND) versus engine speed (RPMX8). This interpolation is performed on a table of KBKMUL versus RPMX8 stored in memory of the ECU 12. The multiplier allows different weighing of the (old) knock sensor voltage value versus the (new) knock sensor voltage value based on RPMX8.

From block 56, the methodology advances to block 58 and calculates a new KBKGND value equal to (KBKMUL multiplied by old KBKGNDx value) plus (1−KBKMUL) multiplied by KNOCKT. The methodology then advances to block 60 and checks the new KBKGND value against a maximum background noise level or value (KBKMAX). The methodology interpolates KBKGND based on a table of maximum background noise value (KBKMAX) versus engine speed (RPMX8). The methodology then advances to decision block 62 and determines whether the new background noise value is greater than KBKMAX. If so, the methodology advances to block 64 and saves KBKMAX as KBKGNDx.

In decision block 62, if the new KBKGND value is not greater than KBKMAX, the methodology advances to block 66 and checks the new KBKGND value against a minimum background noise level or value (KBKMIN). The methodology interpolates KBKGND based on a table of minimum background noise value (KBKMIN) versus engine speed (RPMX8). The methodology then advances to decision block 68 and determines whether the new KBKGND value is greater than KBKMIN. If not, the methodology advances to block 70 and saves KBKMIN as KBKGNDx. If the new KBKGND value is greater than KBKMIN, the methodology advances to block 72 and saves the new KBKGND value as KBKGNDx. Once background updating is completed, the methodology branches to the short term retard section to be described.

Referring back to decision block 54, if RPMX8 is not within KBKWIN, the methodology advances to block 74 and goes to the next KBKGNDx breakpoint. The methodology then advances to diamond 76 and determines whether that was the last KBKGNDx breakpoint. If not, the knock methodology advances back to decision block 54 previously described. If so, the knock methodology abandons background updating and branches to the short term retard section to be described to retard spark for previous knock activity.

Figure 2C:
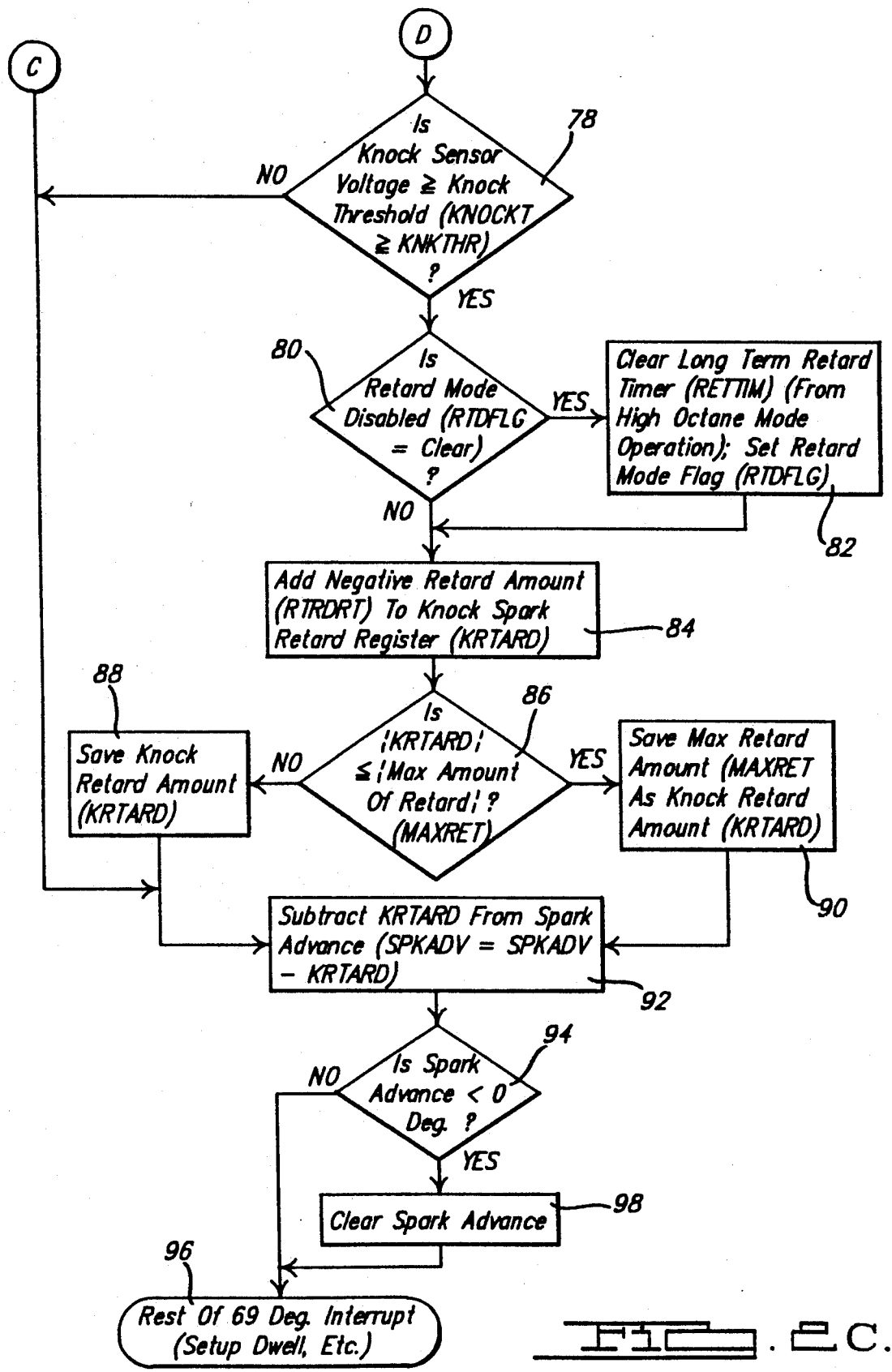

Referring back to decision block 50, if MAP is not less than KNKMAP, the methodology advances to decision block 78 to begin short term spark retard in FIG. 2C. During short term spark retard, the methodology immediately stops engine knock after it occurs. When sufficient knock sensor activity is detected, the methodology retards the spark advance from its normal value for the next ignition event (EPP). The methodology removes the retard quickly, however, after knock ceases to avoid lowering engine efficiency for too long.

In decision block 78, the methodology determines whether the knock sensor voltage signal (KNOCKT) from block 42 is greater than or equal to the knock threshold (KNKTHR). The methodology calculates KNKTHR in the spark advance section using the KBKGND table above-described. The methodology indexes into the KBKGND table with RPMX8 and interpolates between the appropriate breakpoints to get the background noise level. To that, the methodology adds a predetermined delta KBKDLT—again interpolated versus RPMX8 to establish KNKTHR.

If KNOCKT is greater than or equal to KNKTHR, the methodology advances to decision block 80 and determines whether the retard mode is disabled (RTDFLG=clear). If so, the methodology advances to block 82 and clears the long term retard timer (RETTIM) (to discontinue high octane mode operation) and sets the retard mod flag (RTDFLG) to prepare for long term spark retard.

After block 82 is completed or the retard mode is not disabled in decision block 80, the methodology advances to block 84 and increases a knock retard (KRTARD) amount by adding a negative retard rate or amount (RTRDRT) to KRTARD. The methodology then advances to decision block 86 and determines whether the absolute value of KRTARD is less than or equal to the absolute value of a maximum amount of retard (MAXRET). MAXRET is calculated in the spark advance section to be described. If not, the methodology advances to block 88 and saves KRTARD. If so, the methodology advances to block 90 and saves MAXRET as the KRTARD.

Referring back to decision block 78, if KNOCKT is not greater than or equal to KNKTHR, the methodology advances to block 92 to be described. It should be appreciated that the methodology also advances from decision block 76 of FIG. 2A and blocks 64, 70, 72 of FIG. 2B and blocks 88 and 90 of FIG. 2C to block 92 to be described.

In block 92, the methodology subtracts the current KRTARD (to continue compensating for previous knock activity) from the spark advance (SPKADV) (SPKADV=SPKADV−KRTARD) and leaves KRTARD unchanged to set up the ignition timing. The methodology then advances to decision block 94 and determines whether SPKADV is less than zero degrees (0°). If not, the methodology advances to bubble 96 and sets up dwell, etc., similar to bubble 48 previously described. If SPKADV is less than the predetermined value, the methodology advances to block 98 and clears SPKADV (e.g., SPKADV=0). The methodology then advances to bubble 96 previously described.

Figure 4A:
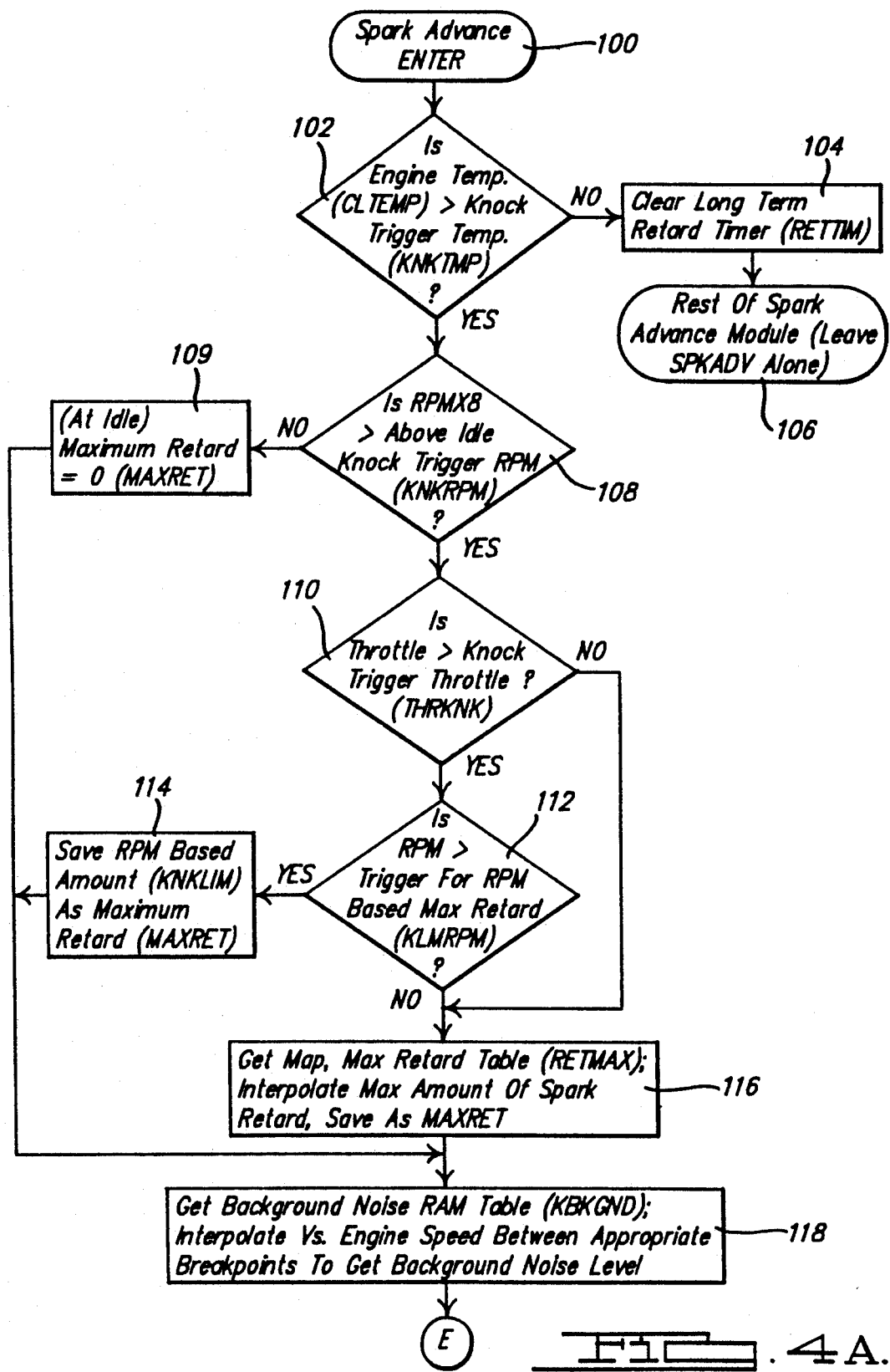
FIG. 4A through D are flowcharts of a spark advance subroutine for the knock strategy of FIG. 2.
Figure 4B:
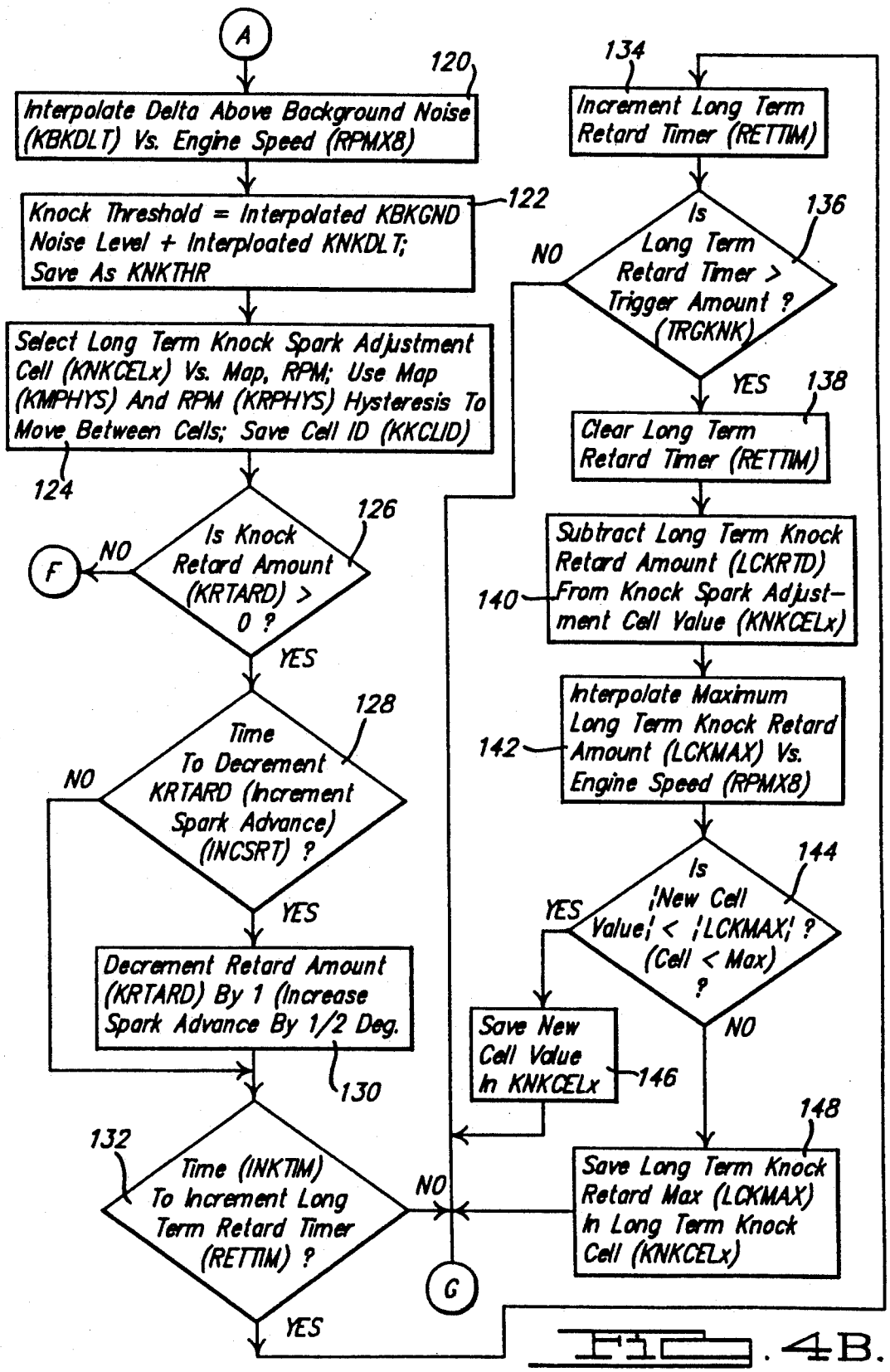
Figure 4C:
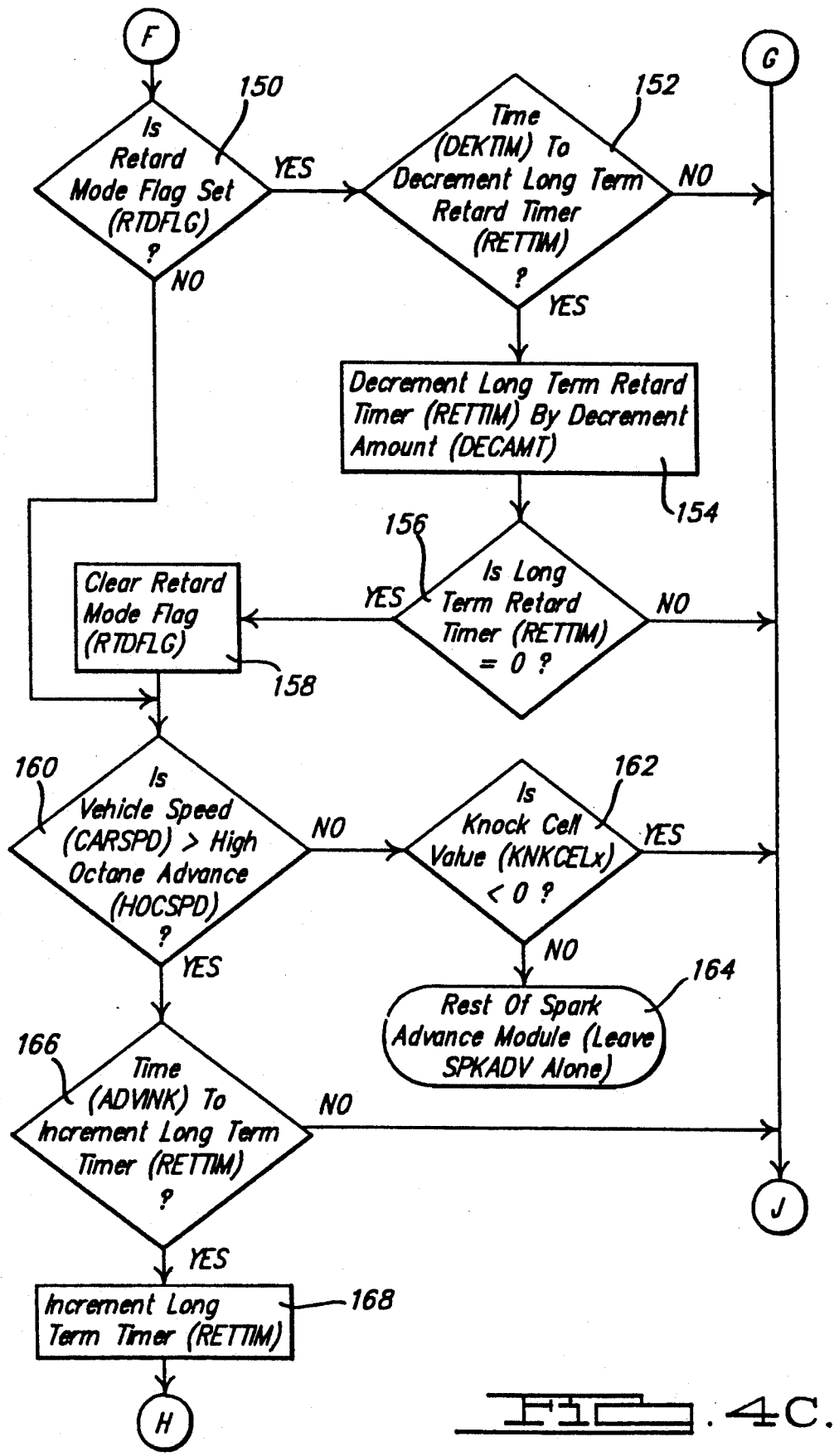

Referring to FIGS. 4A through 4C, a methodology for the spark advance subroutine is shown. After bubbles 48 and 96, the spark advance methodology enters through bubble 100 and advances to decision block 102. In decision block 102, the methodology determines whether the engine temperature (CLTEMP) is greater than the knock trigger temperature (KNKTMP). If not, the methodology advances to block 104 and clears the long term retard timer (RETTIM). The methodology then advances to bubble 106 to leave spark advance unmodified by knock.

In decision block 102, if CLTEMP is greater than KNKTMP, the methodology advances to decision block 108 and determines whether the engine speed (RPMX8) is greater than an idle knock trigger speed (KNKRPM). KNKRPM has a predetermined value corresponding to a low speed stored in memory of the ECU 12. If not, the methodology advances to block 109 and sets the maximum retard (MAXRET) equal to a predetermined value such as zero (0). If RPMX8 is greater than KNKRPM, the methodology advances to decision block 110 and determines whether the throttle is greater than a knock trigger throttle (THRKNK). The throttle position sensor 28 senses the position of the throttle and sends an appropriate signal to the ECU 12. THRKNK has a predetermined value corresponding to a high throttle position stored in memory of the ECU 12. If so, the methodology advances to decision block 112 and determines whether RPMX8 is greater than a knock limit RPM (KLMRPM). If so, the methodology advances to block 114 and saves the rpm based amount (KNKLIM) as the maximum retard (MAXRET).

If the throttle is not greater than THRKNK in decision block 110 or RPMX8 is not greater than KLMRPM in decision block 112, methodology advances to block 116. In block 116, the methodology gets a MAP value from the MAP sensor 22 and interpolates MAXRET versus MAP in a table stored in memory of the ECU 12. The methodology saves the interpolated value as MAXRET.

From blocks 110, 114, 116, the methodology advances to block 118. In block 118, the methodology gets the background noise table (KBKGND) and interpolates engine speed (RPMX8) between appropriate breakpoints (KBKGNDx) to get the corresponding background noise KBKGND) value. The methodology then advances to block 120 in FIG. 4B and interpolates a predetermined delta (KBKDLT) versus engine speed (RPMX8). The methodology then advances to block 122 and sets the knock threshold (KNKTHR) equal to the interpolated KBKGND value plus the interpolated KNKDLT value.

Prior to the long term retard and high octane (long term) spark advance sections, the methodology selects one of a matrix of 10 (RAM) knock cells (KNKCELx) for use therein. From block 122, the methodology advances to block 124 and selects the long term knock spark adjustment cell (KNKCELx) based on a table of MAP versus RPM. Moving out of one cell into another requires exceeding MAP hysteresis (KMPHYS) and RPM hysteresis (KRPHYS). If the combination of MAP and RPMX8 is below the lowest KNKCELx, the methodology ignores the long term retard and spark advance sections and branches to save (an unmodified by knock) spark advance. If MAP and RPMX8 are above the highest KNKCELx, the methodology uses that cell and saves the cell ID as (KKCLID). The methodology then advances to decision block 126.

In decision block 126, the methodology determines whether the knock retard (KRTARD) amount is greater than a predetermined value such as zero (0). If so, the methodology advances to decision block 128 and determines whether it is time to decrement KRTARD once each increment spark advance (INCSRT) amount of time passes. If so, the methodology advances to block 130 and decrements the KRTARD by a predetermined value such as one (1) (increase spark advance by ¼.). Once this is completed or if it is not time to decrement KRTARD, the methodology leaves KRTARD alone and advances to perform long term spark retard in decision block 132. The long term spark retard subtracts a large negative spark advance (retard) from the selected KNKCELx if short term retard is active for a specific length of time.

In decision block 132, the methodology determines whether it is time to increment the long term retard timer (RETTIM). If so, the methodology advances to block 134 and increments RETTIM every time an increment amount of time (INKTIM) passes. The methodology then advances to decision block 136 and determines whether RETTIM is greater than a predetermined long term retard trigger amount (TRGKNK). If so, the methodology advances to block 138 and clears the RETTIM. The methodology then advances to block 140 and subtracts a long term knock retard amount (LCKRTD) from the knock spark adjustment cell value (KNKCELx). The methodology then advances to block 142 and checks the new KNKCELx value against an interpolated maximum long term knock retard amount (LGKMAX) versus engine speed (RPMX8). The methodology then advances to decision block 144 and determines whether the absolute value of the new KNKCELx is less than the absolute value of LGKMAX. If so, the methodology advances to block 146 and saves the LGKMAX in KNKCELx. If not, the methodology advances to block 148 and saves long term knock retard max (LGKMAX) in long term knock cell (KNKCELx).

Referring back to decision block 126, if the knock retard amount (KRTARD) is not greater than the predetermined value such as zero (0), the methodology advances to perform high octane (long term) spark advance in decision block 150. The high octane spark advance increases the long term knock cells under highway cruise conditions as long as the knock control system 10 senses no knock activity.

In decision block 150, the methodology determines whether the retard mode flag is set (RTDFLG). If so, the methodology advances to decision block 152 and determines whether it is time (DEKTIM) to decrement the long term retard timer (RETTIM). If so, the methodology advances to block 154 and decrements the long term retard timer (RETTIM) by a decrement amount (DECAMT) every time a DEKTIM amount of time elapses. The methodology advances to decision block 156 and determines whether RETTIM is equal to a predetermined value such as zero (0). If so, the methodology advances to block 158 and clears the retard mode flag (RTDFLG), thereby allowing RETTIM to be used for high octane spark advance.

After block 158 is completed or the RTDFLG flag has not been set, the methodology advances to decision block 160 and determines whether the vehicle speed (CARSPD) is greater than a high octane advance speed (HOCSPD). HOCSPD has a predetermined value corresponding to a highway speed for allowing long term advance. If not, the methodology advances to decision block 162 and determines whether the knock cell (KNKCELx) value is less than zero (0) (e.g., long term knock retard is held still). If not, the methodology advances to bubble 164 to leave spark advance unmodified by knock.

Figure 4D:
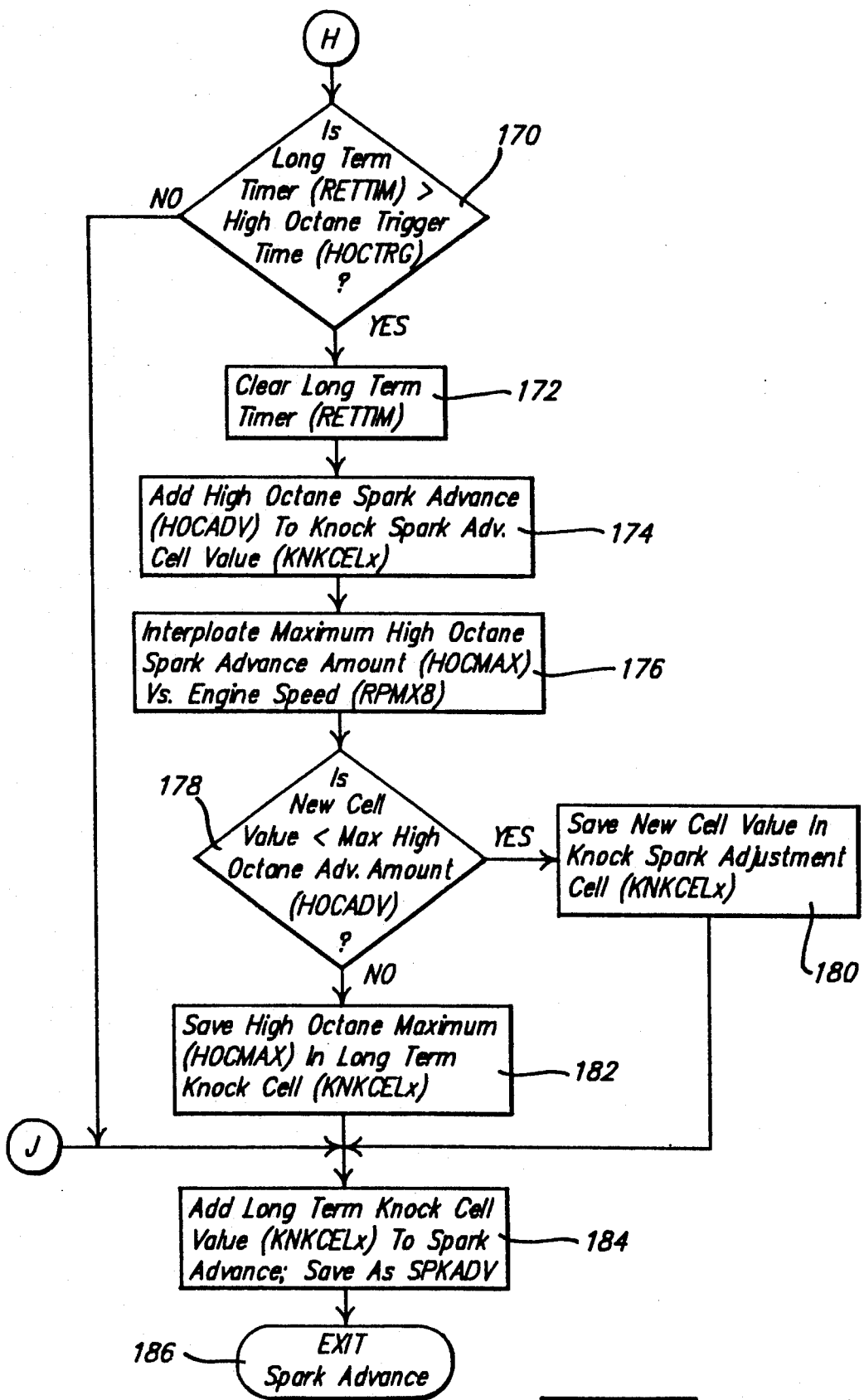

In decision block 160, if CARSPD is greater than HOCSPD, the methodology advances to decision block 166 and determines whether it is time to increment the long term timer (RETTIM). If so, the methodology advances to block 168 and increments the long term timer (RETTIM) every time an advance increment (ADVINK) amount of time passes. The methodology then advances to decision block 170 in FIG. 4D and determines whether the long term timer (RETTIM) is greater than the high octane advance trigger amount (HOCTRG). If so, the methodology advances to block 172 and clears RETTIM. The methodology then advances to block 174 and adds the high octane spark advance (HOCADV) to knock spark advance cell value (KNKCELx). The methodology then advances to block 176 and checks the new KNKCELx value against an interpolated maximum high octane spark advance amount (HOCMAX) versus engine speed (RPMX8). The methodology then advances to decision block 178 and determines whether the new KNKCELx value is less than the maximum high octane advance amount (HOCAVD). If so, the methodology advances to block 180 and saves the new KNKCELx value in knock spark adjustment cell (KNKCELx). If not, the methodology advances to block 182 and saves a high octane maximum (HOCMAX) in long term knock cell (KNKCELx).

From blocks 180 and 182, the methodology advances to block 184. It should be appreciated that the methodology also advances from blocks 136, 146, 148 and 132 of FIG. 4B and blocks 152, 156, 162 of FIG. 4C to block 184 of FIG. 4D. In block 184, the methodology adds the knock cell (KNKCELx) value to spark advance (SPKADV). The methodology then exits through bubble 186.

Referring to FIG. 5, the knock methodology includes a non-diagnostic subroutine. This subroutine eliminates high octane spark advance and reduces (and eventually eliminates) long term retard at the start of each drive trip (non-diagnostic key-on) because driving conditions (e.g., barometric pressure) have likely changed.

The methodology enters through bubble 188 and advances to block 190 to index once through the long term KNKCEL matrix to either clear out an advanced cell or remove some of a retard cell. In block 190, the methodology gets the knock cells and starts with the first knock cell (KNKCELx). The methodology advances to decision block 192 and determines whether the KNKCELx value is greater than zero (0) e.g., has advance in it). If not, the methodology advances to block 194 and adds back spark advance or positive amount (KEYBACK) to KNKCELx to reduce retard with each KEYON. The methodology then advances to decision block 196 and determines whether the KNKCELx value is greater than a predetermined value such as zero (0). If so or the KNKCELx value is greater than zero in decision block 192, the methodology advances to block 198 and clears the KNKCELx value to zero (0).

After block 198 is completed or the KNKCELx value is not greater than zero in decision block 196, the methodology advances to decision block 200 and determines whether the knock cell ID is the last KNKCELx. If not, the methodology advances to block 202 and indexes to the next KNKCELx. The methodology then advances to decision block 192 previously described. If the knock cell ID is the last KNKCELx in decision block 200, the methodology exits through bubble 204.

The present invention has been described in an illustrative manner. It is to be understood that the terminology which has been used is intended to be in the nature of words of description rather than of limitation.

Many modifications and variations ar possible in light of the above teachings. Therefore, within the scope of the appended claims, the present invention may be practiced other than as specifically described.

What is claimed is:

1. A method of controlling knock for an internal combustion engine, said method comprising the steps of:

sensing a plurality of engine conditions;

determining a maximum value of knock;

determining whether a plurality of the sensed engine conditions have achieved predetermined values for updating the maximum value of knock;

using an unmodified spark advance if the plurality of sensed engine conditions have not achieved predetermined values for updating the maximum value of knock; and modifying the spark advance if the plurality of sensed engine conditions have achieved predetermined values for updating the maximum value or knock.

2. A method as set forth in claim 1 wherein said step of determining a maximum value of knock comprises reading knock sensors in a predetermined minimum and maximum range around each engine cylinder ignition's event and storing the maximum value as the maximum value or knock.

3. A method as set forth in claim 1 wherein said step of determining whether the plurality of sensed engine conditions have achieved predetermined values for updating the maximum value of knock comprises:
  checking the temperature of the engine;
  determining whether the checked temperature is greater than a predetermined temperature;
  performing said step of using the unmodified spark advance if the checked temperature is not greater than the predetermined temperature;
  determining whether MAP is less than a predetermined MAP if the checked temperature is greater than the predetermined temperature;
  retarding the spark advance for a short term if MAP is not less than the predetermined MAP;
  calculating a background noise value if MAP is less than the predetermined MAP; and
  using the calculated background noise value as the maximum value of knock.

4. A method as set forth in claim 3 wherein the step of retarding the spark advance for a short term comprises:
  determining whether the maximum value of knock is greater than or equal to a predetermined knock threshold:
  increasing a knock retard amount if the maximum value of knock is greater than or equal to the predetermined knock threshold; and
  subtracting a knock retard amount from the spark advance if the maximum value of knock is not greater than or equal to the predetermined knock threshold.

5. A method as set forth in claim 5 including the step of retarding the spark advance for long term if retarding the spark advance for a short term is active for a predetermined time period.

6. A method as set forth in claim 5 wherein said step of retarding the spark advance for long term comprises:
  determining if the engine temperature is greater than or equal to a predetermined temperature;
  using an unmodified by knock spark advance if the engine temperature is not greater than or equal to the predetermined temperature;
  determining if the knock retard amount is greater than a predetermined value;
  using a high octane (long term) spark advance if the knock retard amount is not greater than the predetermined value; and
  subtracting a long term retard amount from the spark advance if the knock retard amount is greater than or equal to the predetermined value.

7. A method of controlling knock for an internal combustion engine having a microprocessor, memory and sensors for monitoring engine knock, cam, crankshaft, and manifold absolute pressure, said method comprising the steps of:
  reading a plurality of knock sensors;
  updating an adaptive background noise for the knock sensors;
  retarding the short term spark under engine knock conditions;
  retarding the long term spark under persistent engine knock conditions;
  advancing long term spark under extended periods of no knock engine conditions; and
  eliminating high octane spark advance and long term retard.

8. A method as set forth in claim 7 wherein said step of reading comprises reading a first and second knock sensor at a predetermined condition.

9. A method as set forth in claim 7 wherein said step of updating including the steps of:
  obtaining a first adaptive knock background noise breakpoint if MAP is less than MAP knock threshold; and
  determining if the sensed engine speed is within a predetermined range of the first adaptive knock background noise breakpoint.

10. A method as set forth in claim 9 including the steps of:
  interpolating a current noise versus the sensed engine speed if the sensed engine speed is within the predetermined range;
  calculating a new background noise value based on the interpolated value;
  interpolating a maximum noise level versus the sensed engine speed;
  determining if the new background noise level is greater than the maximum noise level;
  interpolating a minimum noise level versus the sensed engine speed if the new background noise level is not greater than the maximum value;
  determining if the new background noise level is greater than the minimum noise level; and
  saving a new value for the knock background if the new background noise level is greater than the minimum noise level.

11. A method as set forth in claim 10 wherein said step of retarding the short term spark comprises the steps of:
  storing a maximum value of knock from the knock sensors;
  sensing engine speed and interpolating a probable MAP knock threshold versus the sensed engine speed;
  sensing coolant temperature and determining if the sensed coolant temperature is greater than or equal to a background updating temperature; and
  determining if MAP is less than the MAP knock threshold if the sensed coolant temperature is greater than or equal to the background updating temperature.

12. A method as set forth in claim 7 wherein said step of retarding the long term spark comprises the steps of:
  determining if the knock sensor voltage is greater than or equal to a knock threshold;
  determining if a retard mode is disabled if the knock sensor voltage is greater than or equal to the knock threshold;
  clearing a long term retard timer if the retard mode is disabled;
  setting a retard mode flag;
  adding a retard amount to a knock spark retard register if the retard mode is not disabled or the retard mode flag is set;
  determining if the knock retard is less than or equal to a maximum retard amount;
  saving the knock retard amount if the knock retard is not less than or equal to the maximum retard amount; and saving the maximum retard amount if the knock retard is less than or equal to the maximum retard amount.

13. A method as set forth in claim 12 including the steps of:
   subtracting the knock retard amount from the spark advance;
   determining if the spark advance is less than a predetermined value;
   clearing the spark advance if the spark advance is less than a predetermined value; and
   setting up a dwell with modified spark advance if the spark advance is not less than a predetermined value.

14. A method as set forth in claim 7 wherein said step of advancing comprises the steps of:
   determining if the sensed engine temperature is greater than a knock trigger temperature;
   clearing a long term retard timer if the sensed engine temperature is not greater than the knock trigger temperature;
   determining if the sensed engine speed is greater than an idle knock trigger speed if the sensed engine speed is greater than the knock trigger temperature;
   determining if the throttle is greater than the knock trigger throttle if the sensed engine speed is greater than the idle knock trigger speed;
   determining if the sensed engine speed is greater than a trigger for the engine speed maximum retard if the throttle is greater than the knock trigger throttle;
   interpolating a maximum amount of spark retard if the sensed engine speed is not greater than the trigger for the engine speed maximum retard or if the throttle is not greater than the knock trigger throttle; and
   interpolating to a background noise level if the sensed engine speed is not greater than the idle knock trigger speed or the sensed engine speed is greater than the trigger for the engine speed maximum retard or the maximum amount of spark retard has been interpolated.

15. A method as set forth in claim 14 including the steps of:
   interpolating a background noise versus engine speed;
   saving a knock threshold value;
   selecting a long term knock spark adjustment cell versus MAP and the engine speed;
   determining if the knock retard amount is greater than a predetermined value; and
   decrementing or incrementing the knock retard timer if the knock retard amount is greater than a predetermined value.

16. A method as set forth in claim 15 including the steps of:
   determining if a long term retard timer is greater than a trigger amount;
   clearing the long term retard timer if the long term retard timer is greater than a trigger amount;
   subtracting a long term knock retard amount from the knock spark adjustment cell;
   interpolating a maximum long term knock retard amount versus the engine speed;
   determining if the new cell value is less than the long term knock retard amount;
   saving the maximum long term knock retard amount of the new cell value is not less than the long term knock retard amount; and
   saving the new cell value if the new cell value is less than the long term knock retard amount.

17. A method as set forth in claim 15 including the steps of:
   determining if the retard mode flag is set if the knock retard amount is not greater than a predetermined value;
   determining if a vehicle speed is greater than a high octane advance if the retard mode flag is not set;
   determining if a long term timer should be incremented if the vehicle speed is greater than a high octane advance; and
   incrementing the long term timer if the long term timer should be incremented.

18. A method as set forth in claim 17 including the steps of:
   decrementing a long term retard timer if the retard mode flag is set and it is time to decrement;
   determining if the long term retard timer is equal to a predetermined value;
   clearing the retard mode flag is the long term retard timer is equal to a predetermined value;
   determining if the knock cell value is less than a predetermined value if the vehicle speed is not greater than a high octane advance; and
   exiting spark advance if the knock cell value is not less than a predetermined value.

19. A method as set forth in claim 7 wherein said step of eliminating comprises the steps of:
   determining if a long term timer is greater than a high octane trigger timer;
   clearing the long term timer and adding a high octane spark advance to a knock spark advance cell value if the long term timer is greater than a high octane trigger timer;
   interpolating a maximum high octane spark advance amount versus the engine speed;
   determining if the new cell value is less than the maximum high octane spark advance;
   saving the new cell value if the new cell value is less than the maximum high octane spark advance;
   saving the maximum high octane spark advance if the new cell value is not less than the maximum high octane spark advance; and
   adding the ling term knock cell value to the spark advance if the long term timer is not greater than the high octane trigger timer or if it is not time to decrement the long term retard timer or if the long term retard timer is not equal to a predetermined value or if the knock cell value is less than a predetermined value or if it is not time to increment the long term timer or if said saving step has occurred.

20. A method as set forth in claim 7 including the steps of:
   determining if the knock cell value is greater than a predetermined value;
   adding a key on spark advance amount to the knock cell value if the knock cell value is not greater than a predetermined value;
   clearing the knock cell if the knock cell value is greater than a predetermined value;
   determining if a knock cell identification is equal to a last cell; and
   exiting if the knock cell identification is equal to the last cell.

* * * * *